(12) United States Patent
Suzuki et al.

(10) Patent No.: US 11,666,967 B2
(45) Date of Patent: Jun. 6, 2023

(54) SINTERED BODY, METHOD OF MANUFACTURING SINTERED BODY, COMBUSTOR PANEL, AND METHOD OF MANUFACTURING COMBUSTOR PANEL

(71) Applicant: Mitsubishi Heavy Industries Aero Engines, Ltd., Aichi (JP)

(72) Inventors: Kenji Suzuki, Tokyo (JP); Syuntaro Terauchi, Osaka (JP); Hisashi Kitagaki, Osaka (JP); Kazuki Hanami, Osaka (JP); Tadayuki Hanada, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 0 days.

(21) Appl. No.: 17/968,917

(22) Filed: Oct. 19, 2022

(65) Prior Publication Data
US 2023/0043599 A1 Feb. 9, 2023

Related U.S. Application Data

(62) Division of application No. 16/067,124, filed as application No. PCT/JP2017/004366 on Feb. 7, 2017, now Pat. No. 11,511,339.

(30) Foreign Application Priority Data

Apr. 5, 2016 (JP) .............................. JP2016-076124

(51) Int. Cl.
*B22F 3/22* (2006.01)
*B22F 3/10* (2006.01)
(Continued)

(52) U.S. Cl.
CPC ............ *B22F 3/225* (2013.01); *B22F 3/1021* (2013.01); *B22F 5/009* (2013.01); *F01D 25/00* (2013.01);
(Continued)

(58) Field of Classification Search
CPC ........ B22F 3/225; B22F 3/1021; B22F 5/009; B22F 1/10; B22F 3/02; B22F 3/10;
(Continued)

(56) References Cited

U.S. PATENT DOCUMENTS

| 5,432,224 A | 7/1995 | Ryuhgoh et al. |
| 5,737,683 A | 4/1998 | Sterzel |

(Continued)

FOREIGN PATENT DOCUMENTS

| EP | 1033193 A1 | 9/2000 |
| EP | 1634972 A2 | 3/2006 |

(Continued)

OTHER PUBLICATIONS

Extended European Search Report for European Application No. 17778850.2 dated Mar. 21, 2019; 10pp.

(Continued)

*Primary Examiner* — Rebecca Janssen
(74) *Attorney, Agent, or Firm* — Kanesaka Berner and Partners LLP

(57) ABSTRACT

By melting a shaping material in which a metal powder and a binder are mixed and by carrying out injection molding (primary shaping) in an injection mold, an injection molded body, or an intermediate shaped body are produced. The injection molded body or the intermediate shaped body is placed by a transfer mold and is subjected to a gravity shaping (secondary shaping) with a transformation. A sintered body is manufactured by carrying out debindering and sintering to the injection molded body.

4 Claims, 16 Drawing Sheets

(51) Int. Cl.
*F23R 3/00* (2006.01)
*B22F 1/10* (2022.01)
*B22F 5/00* (2006.01)
*F01D 25/00* (2006.01)
*F23R 3/42* (2006.01)
*F02C 7/00* (2006.01)
*B22F 3/16* (2006.01)
*B22F 3/02* (2006.01)

(52) U.S. Cl.
CPC ............... *F02C 7/00* (2013.01); *F23R 3/002* (2013.01); *F23R 3/42* (2013.01); *B22F 1/10* (2022.01); *B22F 3/02* (2013.01); *B22F 3/10* (2013.01); *B22F 3/16* (2013.01); *B22F 3/227* (2013.01); *B22F 2005/005* (2013.01); *B22F 2998/10* (2013.01); *B22F 2999/00* (2013.01); *F23R 2900/00018* (2013.01)

(58) Field of Classification Search
CPC ...... B22F 3/16; B22F 3/227; B22F 2005/005; B22F 2998/10; B22F 2999/00; F01D 25/00; F02C 7/00; F23R 3/002; F23R 3/42; F23R 2900/00018
See application file for complete search history.

(56) References Cited

U.S. PATENT DOCUMENTS

| 6,444,167 B1 | 9/2002 | Shimodaira et al. |
| 2006/0099103 A1 | 5/2006 | Wohlfromm et al. |
| 2011/0212339 A1 | 9/2011 | Binder et al. |
| 2012/0153549 A1 | 6/2012 | Milagres Ferri et al. |
| 2016/0016230 A1* | 1/2016 | Campomanes ......... B29C 35/02 264/118 |

FOREIGN PATENT DOCUMENTS

| JP | H0313504 A | 1/1991 |
| JP | H0331403 A | 2/1991 |
| JP | H0881701 A | 3/1996 |
| JP | 2000038605 A | 2/2000 |
| JP | 2000096103 A | 4/2000 |
| JP | 2000340303 A | 12/2000 |
| JP | 2001152205 A | 6/2001 |
| JP | 2005350710 A | 12/2005 |
| JP | 2006505688 A | 2/2006 |
| JP | 2009103280 A | 5/2009 |
| JP | 2012126996 A | 7/2012 |

OTHER PUBLICATIONS

Office Action for corresponding Japanese Application No. 2016-076124 dated Dec. 11, 2019; 6pp.
Written Opinion in International Application No. PCT/JP2017/004366 dated Apr. 25, 2017; 6pp.

* cited by examiner

SINTERED BODY, METHOD OF MANUFACTURING SINTERED BODY, COMBUSTOR PANEL, AND METHOD OF MANUFACTURING COMBUSTOR PANEL

RELATED APPLICATIONS

The present application is a Divisional of U.S. application Ser. No. 16/067,124 filed Jun. 29, 2018, which is a National Phase of PCT/JP2017/004366, filed Feb. 7, 2017, and claims priority based on Japanese Patent Application No. 2016-076124, filed Apr. 5, 2016.

TECHNICAL FIELD

The present invention relates to a sintered body using a metal powder as a material, a method of manufacturing the sintered body, a combustor panel, and a method of manufacturing the combustor panel.

BACKGROUND ART

A metal powder injection molding (hereinafter, to be also called "MIM") method is a method of melting a shaping material in which a metal fine powder and an organic binder (e.g. a mixture of a plurality of resins, and hereinafter, to be called "a binder") are mixed, and carrying out injection molding using it, and then carrying out a debindering and a sintering. Thus, a metal powder shaping article is manufactured.

For example, the metal fine powder used for MIM is formed in a fine powder manufacturing process by a spraying method. When a nickel-based alloy containing titanium having high strength at high temperature is manufactured by the spraying method, there is a case that it is difficult to manufacture the fine powder for MIM, because "pouring blockage" occurs in which a nozzle is blockaded in the process of manufacturing the fine powder. In order to prevent this "pouring blockage", Patent Literature 1 (JP 2005-350710A) discloses an invention in which a concentration of titanium in the nickel-based alloy is restricted below 0.1 mass % and another invention in which a concentration of niobium is decreased when the concentration of titanium exceeds 1 mass %.

Also, Patent Literature 2 (JP 2000-340303A) discloses an invention of a method of manufacturing a metal housing for the purpose of preventing softening deformation of a molding green body in MIM. The method of manufacturing the metal housing disclosed in Patent Literature 2 places the molding green body on a processing tray in a debindering and sintering process of the molding green body in such a manner that the flat surface of the molding green body is on a ground surface side. Thus, the softening deformation by its own weight of the molding green body is prevented.

According to the method of manufacturing the metal housing described in Patent Literature 2, any deformation of the green body during heating processing can be prevented and cracks and breakages can be substantially reduced.

Also, Patent Literature 3 (JP 2001-152205A) discloses a binder that can prevent any deformation of the molding green body without using a special jig, in a debindering process of the molding green body. The binder disclosed in Patent Literature 3 is a mixture of a plurality of binder components.

If the binder disclosed in Patent Literature 3 is used, the shape of the molding green body can be prevented from collapsing due to the binder component having been softened during heating in the debindering process. A residue remains among the grains of the metal powder after the binder is dissolved, and the shape of molding green body is maintained for the existence of the residue. The binder is not fully removed from the molding green body, and the debindering process is carried out so that about 5 volume % of the initial total amount of the binder is left in the shaped body. Therefore, the shape of molding green body can be maintained just as it is without deforming in the debindering process. A sintered body excellent in shape can be easily obtained through the sintering process after that.

Also, Patent Literature 4 (JP 2009-103280A) discloses an MIM shaping article of a dynamic bearing device in which the occurrence of defects such as warpage which is caused by residual stress is restrained effectively by setting oppression force in pressing to a small value. The MIM shaping article disclosed in Patent Literature 4 is manufactured as follows.

First, an intermediate shaped body is manufactured by removing the binder from the injection molded body formed of a shaping material in which a metal powder and a binder are mixed. Second, a thrust dynamic pressure generating section is formed by pressing the intermediate shaped body. Third, the intermediate shaped body after the pressing is sintered. Thus, the MIM shaping article is manufactured.

The intermediate shaped body of the MIM shaping article (thrust dynamic pressure generating section) disclosed in Patent Literature 4 has many inner pores after the removal of binder (after the debindering), and is soft compared with the sintered body obtained after the sintering. Therefore, the thrust dynamic pressure generating section can be easily formed in a high precision by pressing before sintering after the removal of binder. Also, since the oppression force in pressing can be set small, the occurrence of defects such as warpage caused by the residual stress can be restrained effectively.

Also, Patent Literature 5 (JP 2006-505688A) discloses injection molding material for metal injection molding which can be economically applied to a wide area. The injection molding material disclosed in Patent Literature 5 contains: a) a metal powder of 40-70 volume % containing iron containing powder of at least 50 mass % to a total amount of metal and particles having at least 90 mass % to the mass of iron containing powder and having the effective diameter of at least 40 μm; b) a thermoplastic binder of 30-60 volume %; and c) a dispersant of 0-5 volume % and/or other auxiliary agent.

CITATION LIST

[Patent Literature 1] JP 2005-350710A
[Patent Literature 2] JP 2000-340303A
[Patent Literature 3] JP 2001-152205A
[Patent Literature 4] JP 2009-103280A
[Patent Literature 5] JP 2006-505688A

SUMMARY OF THE INVENTION

A sintered body is manufactured which has a shape difficult to shape only by a primary shaping of metal powder injection molding.

In one aspect of the present invention, a sintered body manufactured by placing on a transfer mold an injection molded body formed by injecting in an injection mold a shaping material in which a metal powder and a binder are mixed, and an intermediate shaped body after carrying out a debindering to the injection molded body, by carrying out a gravity shaping with a transformation due to the gravity, and by carrying out a sintering and a debindering to the injection molded body after the gravity shaping or carrying out the sintering to the intermediate shaped body after the gravity shaping.

The injection molded body of the above-mentioned sintered body has a flat plate base section and a plurality of convex sections extending vertically from the flat plate base section. In the gravity shaping, the flat plate base section is bent to form the bent base section surface. The plurality of convex sections extend in a normal direction to the bent base section surface.

The gravity shaping of the above-mentioned sintered body can include shaping convex sections or concave sections in a part of the injection molded body or the intermediate shaped body.

The above-mentioned sintered body is manufactured by carrying out a secondary shaping with a transformation to an intermediate shaped body that is formed by carrying out a debindering to an injection molded body primary-shaped by injecting into an injection mold a shaping material in which the metal powder and a binder are mixed, in a range of a shaping temperature that causes surface melting of the metal powder, and by carrying out a sintering to the intermediate shaped body after the secondary shaping.

The above-mentioned sintered body is manufactured by grasping by a torsion secondary shaping tool, a first part and a second part of an injection molded body produced by a primary shaping by injecting in an injection mold a shaping material in which a metal powder and a binder are mixed or an intermediate shaped body produced by carrying out a debindering to the injection molded body, by relatively rotating the first part and the second part by the torsion secondary shaping tool to carry out a torsion secondary shaping with a torsion deformation. Furthermore, the sintered body is manufactured by carrying out a debindering and a sintering to the injection molded body after the torsion secondary shaping or the sintering to the intermediate shaped body after the torsion secondary shaping.

In an aspect of the present invention, a combustor panel of a turbine engine is manufactured by carrying out a secondary shaping with a transformation to an injection molded body produced by a primary shaping by injecting in an injection mold a shaping material in which a metal powder and a binder are mixed or an intermediate shaped body after carrying out a debindering to the injection molded body, and by carrying out a debindering and a sintering to the injection molded body after the secondary shaping or the sintering to the intermediate shaped body after the secondary shaping. The combustor panel of the turbine engine has a bent base section surface and a plurality of convex sections for heat radiation extending in a normal direction to the bent base section surface.

In an aspect of the present invention, a method of manufacturing a sintered body comprises a debindering process, a sintering process and a secondary shaping process (FIG. 2). The debindering process is a process of carrying out a debindering to an injection molded body produced by a primary shaping by injecting into an injection mold a shaping material in which a metal powder and a binder are mixed, to produce an intermediate shaped body. The sintering process is a process of carrying out a sintering to the intermediate shaped body to produce a sintered body. The secondary shaping process is a process of transforming the injection molded body or the intermediate shaped body before the sintered body is produced.

The above-mentioned secondary shaping process contains a process of pressing the injection molded body or the intermediate shaped body to a transfer mold by an action of gravity.

The above-mentioned method of manufacturing the sintered body includes an injection molded body placing process of placing the injection molded body on the transfer mold (FIG. 7). The above-mentioned debindering process contains carrying out a debindering to the injection molded body in a state that the injection molded body is placed on the transfer mold, to produce the intermediate shaped body. The above-mentioned secondary shaping process contains a process of heating the intermediate shaped body to a shaping temperature in a state that the intermediate shaped body is placed on the transfer mold, to produce an intermediate shaped body after secondary shaping. The above-mentioned sintering process contains a process of carrying out a sintering to the intermediate shaped body after secondary shaping to produce the sintered body.

The above-mentioned method of manufacturing the sintered body further includes a process of preventing the injection molded body from inclining or moving by holding a part of the injection molded body by using a holding section; and an intermediate shaped body placing process (FIG. 15 etc.). The above-mentioned debindering process contains a process of carrying out the debindering to the injection molded body while the part of the injection molded body is held by using the holding section, to produce a shrunken intermediate shaped body. The above-mentioned intermediate shaped body placing process contains a process of inclining or moving onto the transfer mold when the shrunken intermediate shaped body leaves from the holding section. The above-mentioned secondary shaping process contains a process of heating the intermediate shaped body to a shaping temperature in a state that the intermediate shaped body is placed on the transfer mold, to produce the intermediate shaped body after secondary shaping. The above-mentioned sintering process contains a process of carrying out the sintering to the intermediate shaped body after secondary shaping, to produce the sintered body.

The above-mentioned intermediate shaped body placing process contains a process of making the shrunken intermediate shaped body leave from the holding section by the gravity, so as to be placed on the transfer mold.

The above-mentioned method of manufacturing of the sintered body further contains an intermediate shaped body placing process of placing the intermediate shaped body on the transfer mold (FIG. 12 etc.). The above-mentioned secondary shaping process contains a process of heating the intermediate shaped body to the shaping temperature in a state that the intermediate shaped body is placed on the transfer mold, to produce the intermediate shaped body after secondary shaping. The above-mentioned sintering process contains a process of carrying out the sintering to the intermediate shaped body after secondary shaping, to produce the sintered body.

The above-mentioned injection molded body has a flat plate base section and a plurality of convex sections radially extending from the flat plate base section. The above-mentioned secondary shaping process contains a process of bending the flat plate base section by using the transfer mold, to form a bent base section surface. The above-mentioned plurality of convex sections of the sintered body extend in a normal direction to the bent base section surface.

The above-mentioned secondary shaping process includes a process of grasping a first part and a second part of the injection molded body or the intermediate shaped body, and rotating the first part and the second part relatively to apply torsion transformation to the injection molded body or the intermediate shaped body.

The above-mentioned metal powder is nickel-based alloy, cobalt-based alloy or steel. The shaping temperature in the secondary shaping process is a range from 1200 K to 1650 K.

The shaping temperature in the secondary shaping process is in a temperature range which causes surface melting of the metal powder.

The above-mentioned secondary shaping process includes transforming the injection molded body to produce an injection molded body (10B etc.) after secondary shaping (FIG. 6).

In an aspect of the present invention, the method of manufacturing a combustor panel contains a debindering process, a sintering process and a secondary shaping process, and is a method of manufacturing a combustor panel by carrying out a debindering and a sintering of an injection molded body formed by a primary shaping by injecting into an injection mold a shaping material in which a metal powder and a binder are mixed. The injection molded body has a flat plate base section and a plurality of convex sections for heat radiation extending vertically from the flat plate base section. The debindering process is a process of carrying out a debindering to the injection molded body to produce an intermediate shaped body. The sintering process is a process of carrying out a sintering to the intermediate shaped body to produce a sintered body. The secondary shaping process is a process of placing the injection molded body or the intermediate shaped body on a transfer mold before the sintered body is produced, and carrying out a gravity shaping of bending the flat plate base section to form a bent base section surface.

The sintered body difficult to shape only by the primary shaping of the metal powder injection molding can be manufactured.

DESCRIPTION OF EMBODIMENTS

Referring to the attached drawings, embodiments of a sintered body manufactured by MIM (Metal Injection Molding), a method of manufacturing of the sintered body, a combustor panel, and a method of manufacturing of the combustor panel will be described below.

Figure 1:
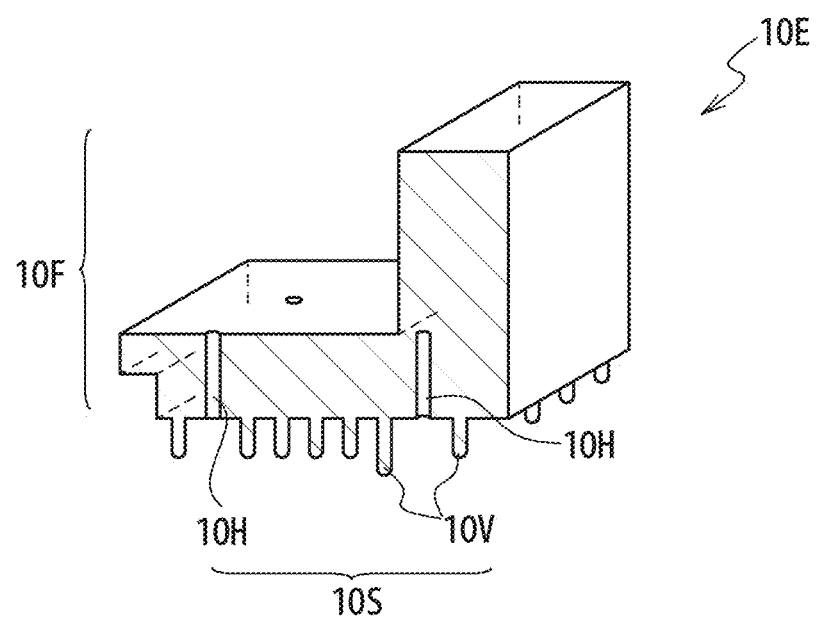
FIG. 1 is a perspective view showing a partial cross-sectional view of a sintered body manufactured by carrying out an injection molding (a primary shaping) and a secondary shaping.
Figure 2:
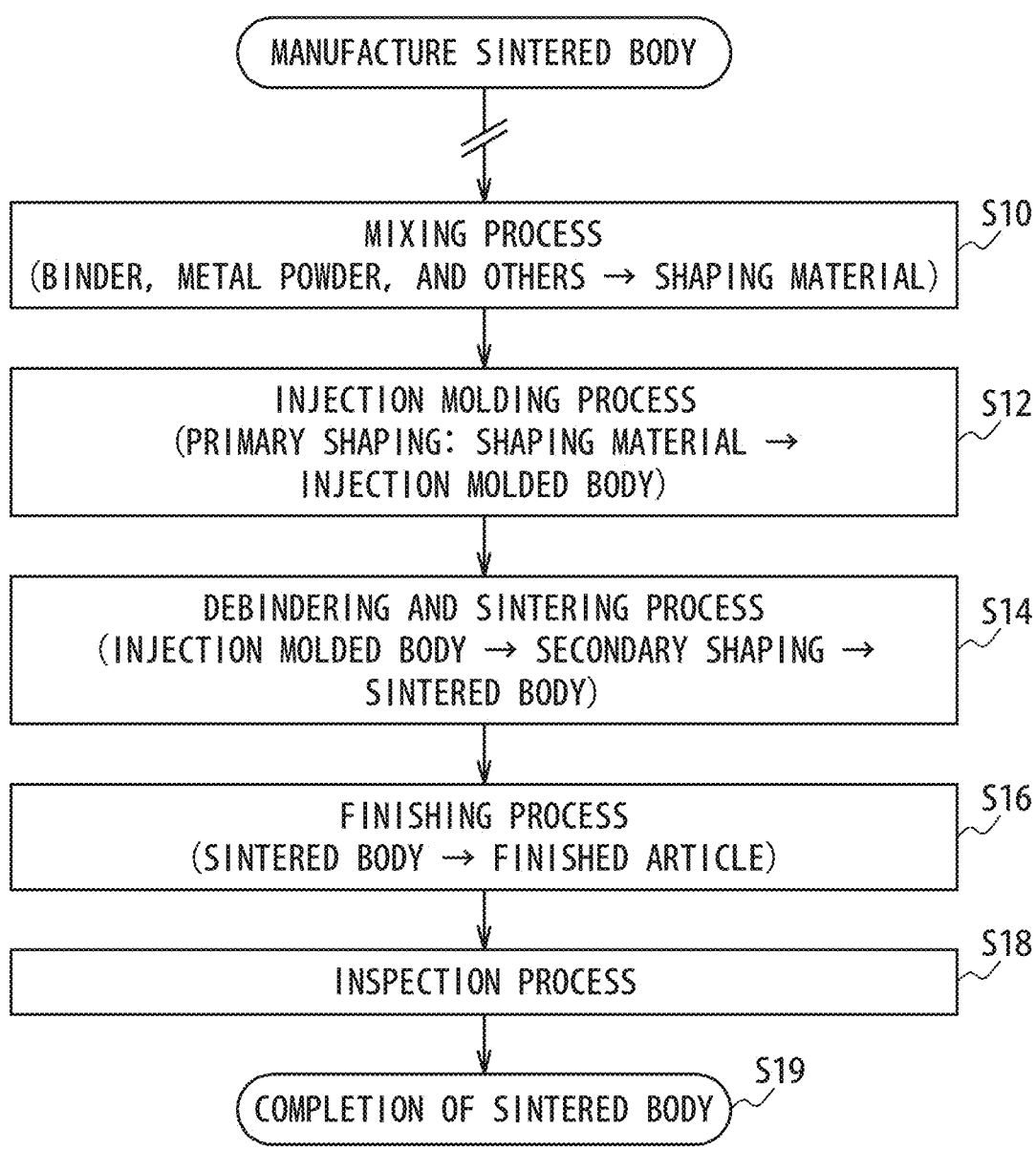
FIG. 2 is a flow chart showing a method of manufacturing the sintered body, in which the secondary shaping is carried out in a debindering and sintering process.
Figure 3:
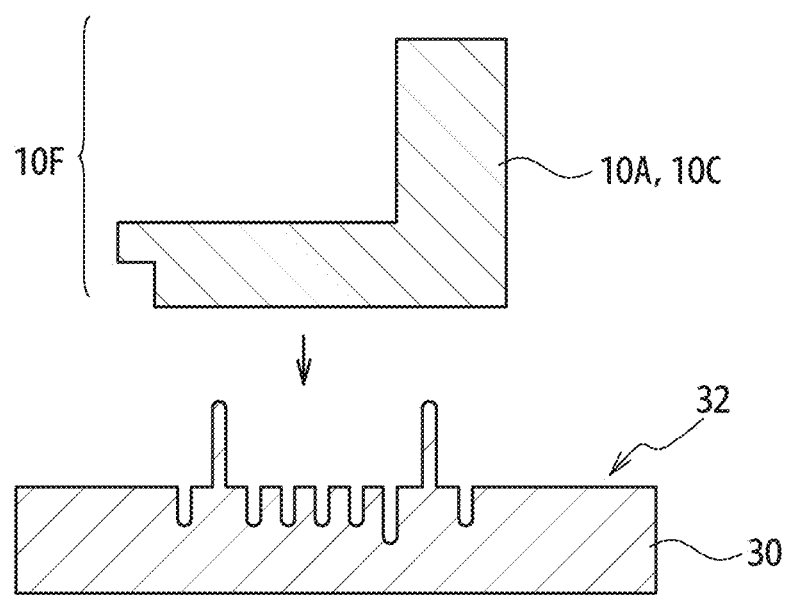
FIG. 3 is a cross-sectional view of an injection molded body or an intermediate shaped body and a transfer mold.
Figure 4:
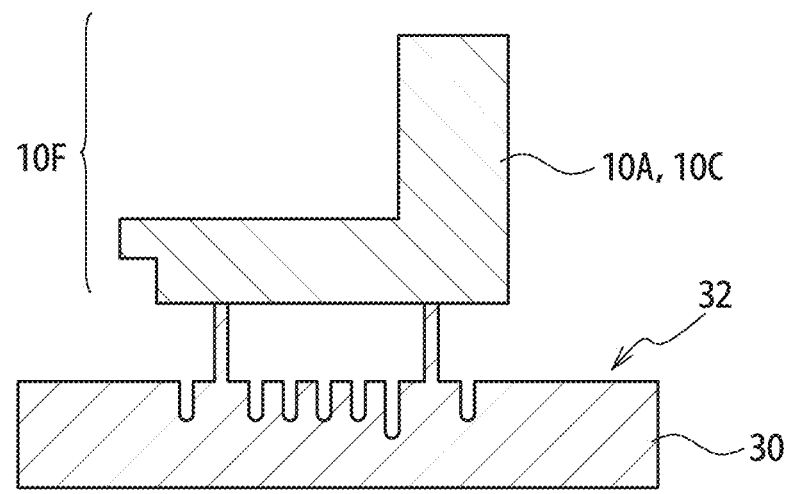
FIG. 4 is a cross-sectional view showing a state that the injection molded body or the intermediate shaped body is placed on a transfer surface of the transfer mold.
Figure 5:
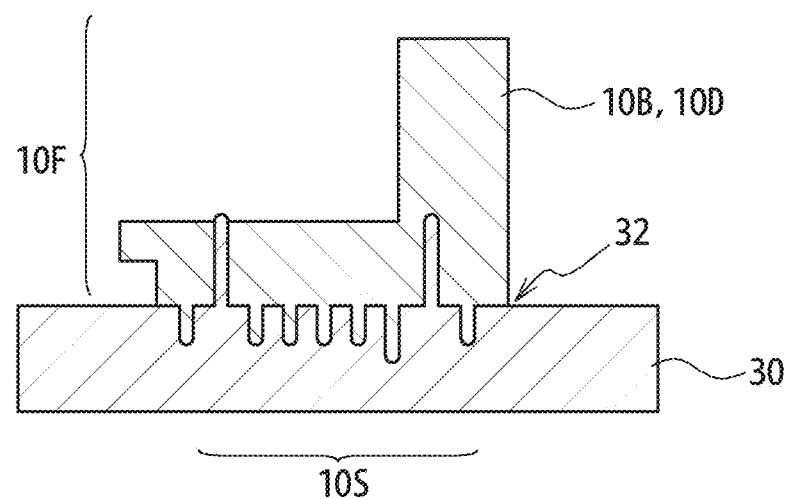
FIG. 5 is a cross-sectional view showing the injection molded body or the intermediate shaped body after the secondary shaping.

Overview of Method of Manufacturing of Sintered Body in which Secondary Shaping is Carried Out Before Sintered Body is Manufactured Referring to FIG. 1 to FIG. 5, the overview of a method of manufacturing of the sintered body in which a secondary shaping (a gravity shaping) is carried out in a debindering process or a sintering process after an injection molding (a primary shaping) in MIM will be described. FIG. 1 is a perspective view showing a partial cross-section of the sintered body manufactured by carrying out the injection molding (the primary shaping) and the secondary shaping. FIG. 2 is a flow chart showing the method of manufacturing of the sintered body in which the secondary shaping is carried out in a debindering and sintering process. FIG. 3 is a cross-sectional view showing an injection molded body 10A (an intermediate shaped body 10C) and a transfer mold 30. FIG. 4 is a cross-sectional view showing a state that the injection molded body 10A (the intermediate shaped body 10C) is placed on a transcribing surface 32 of the transfer mold 30. FIG. 5 is a cross-sectional view showing the injection molded body 10B after secondary shaping (an intermediate shaped body 10D).

Referring to FIG. 1, the sintered body 10E formed by carrying out the secondary shaping in a debindering process or a sintering process in MIM will be described. The sintered body 10E is formed by sintering a metal powder (grain diameter: 1 μm to 100 μm) of nickel-based alloy, cobalt-based alloy, titanium alloy, tungsten alloy, stainless steel, tool steel, aluminum alloy, copper alloy, and other alloy.

The sintered body 10E is configured from a primary shaping part 10F shaped by the primary shaping (the injection molding) and a secondary shaping part 10S shaped by the secondary shaping (the gravity shaping). In the embodiment shown in FIG. 1, the secondary shaping part 10S has a plurality of convex sections 10V and a plurality of concave sections 10H. Note that the plurality of convex sections 10V and the plurality of concave sections 10H are not limited to the shape in the embodiment shown in FIG. 1 and may be shaped to various shapes.

Next, referring to FIG. 2, the method of manufacturing the sintered body in which the secondary shaping is carried out in the debindering and sintering process will be described.

Mixing Process

At step S10 (a mixing process), a worker mixes a binder, a metal powder and an additive according to necessity, to form a shaping material. This shaping material may be in a condition mixed simply in a mixing dram, or the metal powder and the binder in a melted condition may be mixed and grains may be formed.

As the binder, a mixture of one or more of organic compounds such as paraffin wax, carnauba wax, and fatty acid ester and one or more of thermoplastic resins with relatively low melting points such as polyethylene (PE), polypropylene (PP), ethylene vinyl acetate copolymer (EVA) can be used.

Injection Molding Process: Primary Shaping Process

At step S12 (an injection molding process), the worker supplies the shaping material formed at the step S10 to an injection molding machine, sends the shaping material melted by heating (the shaping material with the binder melted) to the injection mold by applying pressure, to carry out the injection molding (the primary shaping), opens the mold after cooling for a predetermined time period, and takes out an injection molded body (called a green body) from the mold. FIG. 3 shows a shaping example of the injection molded body 10A.

Debindering and Sintering Process

In a debindering process of the debindering and sintering process at the step S14, the worker carries out heating and so on to the injection molded body 10A produced at the step S12, to remove the binder distributed in the injection molded body 10A. By carrying out this debindering process, a porous intermediate shaped body 10C configured of the metal powder (or an intermediate shaped body 10D after the secondary shaping) is produced. As the debindering method, a heating debindering method of debindering by heating, a light debindering method of debindering by irradiation of a beam, a solvent debindering method of debindering by immersion into water, organic solvent and so on, or other methods can be used according to the physical property of the binder.

In the sintering process, the worker arranges and heats the intermediate shaped body 10C (or the intermediate shaped body 10D after the secondary shaping) in a heating furnace under a vacuum atmosphere or an inert gas atmosphere, to grow neck coupling between grains of the metal powder. Thus, a sintered body is produced. As the sintering temperature, a temperature in a range from 1200 K to 1650 K (more desirably, from 1473 K to 1573 K) can be used in case of using nickel-based alloy, cobalt-based alloy or steel for the metal powder. Also, as the sintering temperature, a temperature in a range from 74% to 96% of the melting point in the thermodynamics temperature of the metal powder can be used.

Secondary Shaping in Debindering and Sintering Process

In the debindering and sintering process, the secondary shaping can be carried out to the injection molded body 10A or the intermediate shaped body 10C. As the secondary shaping, a gravity shaping may be carried out in which the injection molded body 10A or the intermediate shaped body 10C is placed on the transfer mold to be transformed due to its weight, or a torsion secondary shaping using torsion secondary shaping jigs may be carried out. The secondary shaping to the injection molded body 10A before the debindering process (to be described later with reference to FIG. 6) and the secondary shaping to the intermediate shaped body 10C before the sintering process (to be described later with reference to FIG. 7, FIG. 12, and FIG. 15) may be carried out. Note that the gravity shaping is a method of shaping through transformation due to the gravity in a state that the injection molded body or the intermediate shaped body is placed on the transfer mold.

In the secondary shaping (e.g. the gravity shaping), the injection molded body 10A (or the intermediate shaped body 10C) is places on a transcribing surface 32 of the transfer mold 30 as shown in FIG. 4. Then, by carrying out the secondary shaping, an injection molded body 10B (or the intermediate shaped body 10D) after the secondary shaping is produced to have a secondary shaped portion 10S in which the shape of transcribing surface 32 is transcribed, as shown in FIG. 5. After that, the sintering is carried out to produce the sintered body 10E (reference to FIG. 1).

Finishing Process

At step S16 (a finishing process), the worker carries out to the sintered body 10E, removal processing of unnecessary parts such as a gate section and a chuck section, finish processing for precision management and surface roughness management, correction of flatness and right angle and so on according to necessity.

Inspection Process

At step S18 (an inspection process), the worker carries out measurement of predetermined inspection items required to the sintered body 10E to carry out acceptance judgment (quality judgement) as a product. When the acceptance judgment is carried out to all the inspection items, the finished article of the sintered body 10E is complete and the manufacturing process of the sintered body is ended (Step S19 (completion of the sintered body)).

When such a shape as shown in FIG. 1 which has complicated convex sections and concave sections should be formed by MIM using only the injection molding (the primary shaping), the filling of shaping material into a part having the complicated shape in the injection mold is difficult so that a possibility that a melting defect (metal being not filled) is caused is high. Moreover, a size change and a transformation are easy to occur in a structure section having the complicated shape in the debindering and sintering process and a possibility that a breakage and cracks due to shrinkage occur is high. If a rough shape is shaped in the injection molding (the primary shaping) and then a complicated shape is shaped in the secondary shaping, the occurrence of the melting defect and other defects in the sintered body can be decreased. Also, by using the gravity shaping, the sintered body having the complicated shape can be mass-produced without excessive effort in the secondary shaping.

Secondary Shaping to Injection Molded Body 10A

Figure 6:
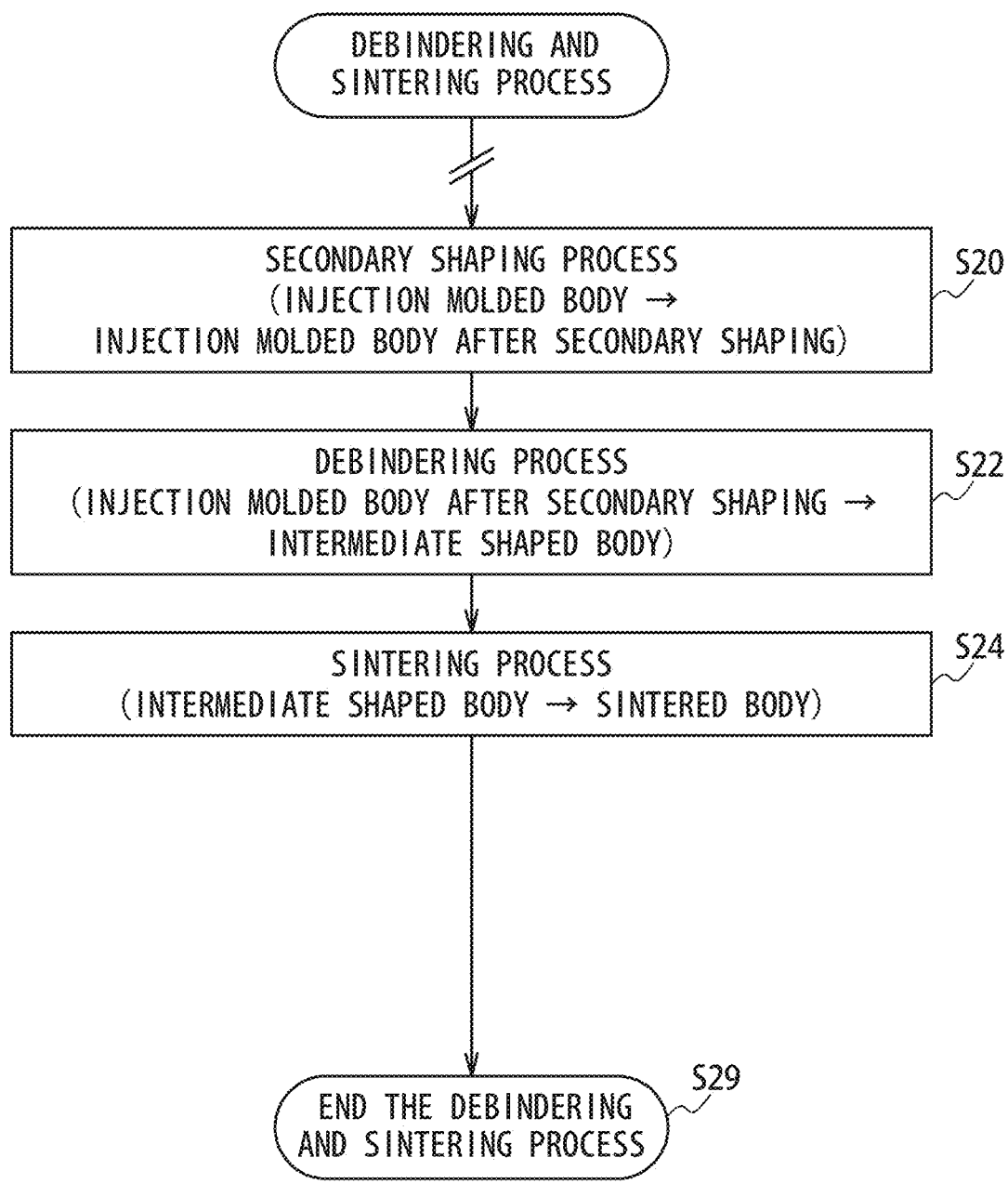
FIG. 6 is a flow chart showing the details of the debindering and sintering process shown at step S14 of FIG. 2.

Next, the processing of carrying out the secondary shaping to the injection molded body 10A to produce the injection molded body 10B after secondary shaping will be described with reference to FIG. 1, FIG. 4, FIG. 5, and FIG. 6. FIG. 6 is a flow chart showing the details of the debindering and sintering process shown at the step S14 of FIG. 2.

Secondary Shaping Process

At step S20 (a secondary shaping process), the worker places the injection molded body 10A on the transcribing surface 32 of the transfer mold 30 as shown in FIG. 4. For example, the injection molded body 10A and the transfer mold 30 are placed in the heating furnace and a temperature is raised (for example, to a temperature in a range from 250 K to 500 K), to make the binder soft. Thus, the shape of transcribing surface 32 is transcribed to the secondary shaped part 10S of the injection molded body 10A. Thus, the injection molded body 10B after secondary shaping is produced as shown in FIG. 5. The material such as ceramics to endure high temperature and the material used for a mold can be used as the material of transfer mold 30.

Debindering Process

At step S22 (the debindering process), the worker carries out the debindering process such as the heating debindering, the light debindering, and the solvent debindering, to remove the binder in the state that the shape of injection molded body 10B after secondary shaping is maintained. Thus, the intermediate shaped body 10D is produced. Note that by carrying out the debindering of the binder, the intermediate shaped body 10D shrinks by 20% to 30% as compared with the injection molded body 10B after secondary shaping. Note that the secondary shaping described at the step S20 can be carried out at the same time as the debindering process. Also, in the debindering process, since the injection molded body 10B after secondary shaping shrinks, the debindering process may be carried out in the state that the injection molded body 10B after secondary shaping shown in FIG. 5 is removed from the transfer mold 30.

Sintering Process

At step S24 (the sintering process), the worker arranges and heats the intermediate shaped body 10D in the heating furnace, to produce the sintered body 10E (reference to FIG. 1). Note that by carrying out the sintering, the sintered body 10E shrinks from 2% to 20%, compared with the intermediate shaped body 10D before the sintering. At the next step S29 (end the debindering and sintering process), the debindering and sintering process shown at the step S14 of FIG. 2 is ended.

Explanation of Embodiment in which Secondary Shaping is Carried Out after Debindering is Carried Out in State that Injection Molded Body is Placed on Transfer Mold

Secondary Shaping of Intermediate Shaped Body

Figure 7:
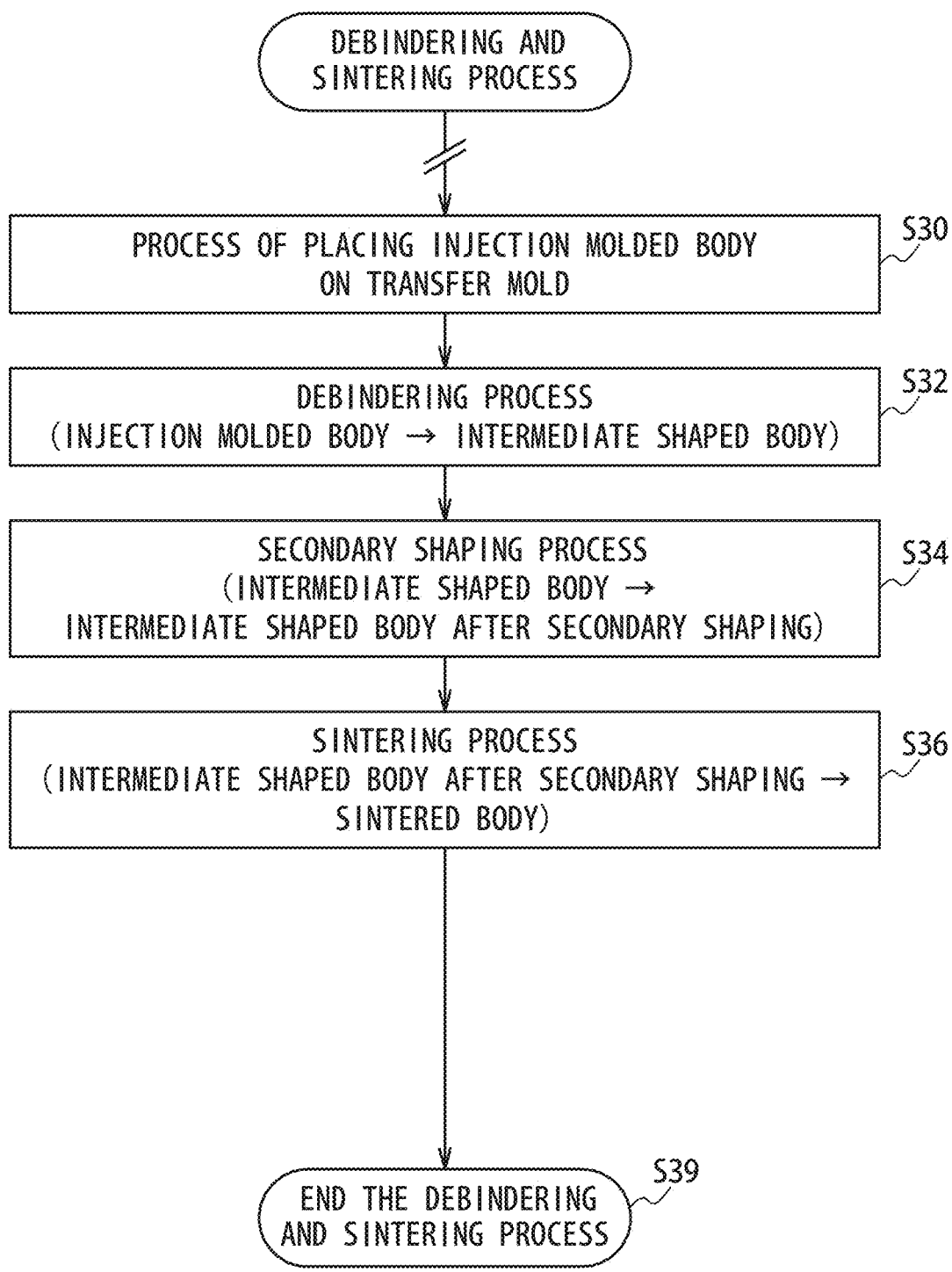
FIG. 7 is a flow chart showing the details of the debindering and sintering process shown at the step S14 of FIG. 2.
Figure 8:
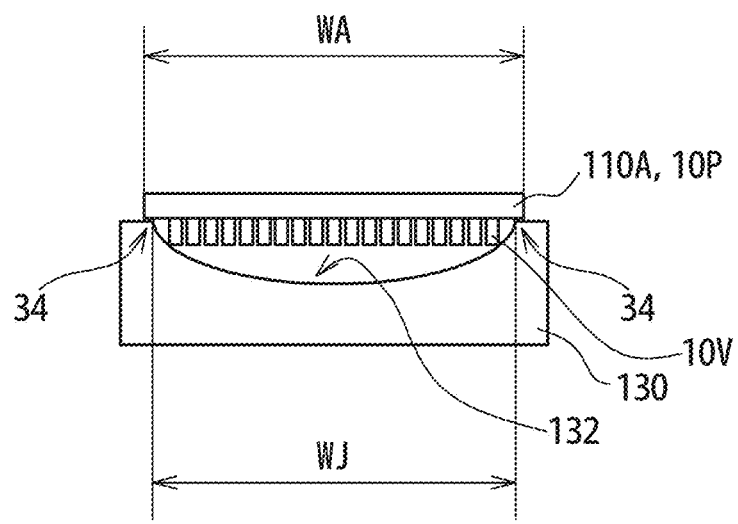
FIG. 8 is a side view showing a state that the injection molded body is placed on a holding section of the transfer mold.
Figure 9:
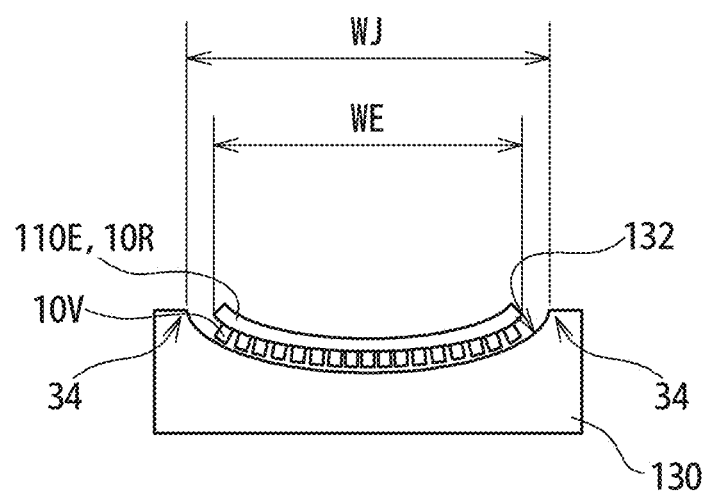
FIG. 9 is a side view showing the transfer mold and the sintered body in which a flat plate base section is bent in the secondary shaping to form a bent base section surface.

Next, the processing in an embodiment in which the debindering is carried out in a state that the injection molded body 110A is placed on the transfer mold 130 having a concave type transcribing surface 132, to produce an intermediate shaped body, and then a secondary shaping is carried out to this intermediate shaped body will be described with reference to FIG. 7 to FIG. 9. FIG. 7 is a flow chart showing the details of the debindering and sintering process shown at the step S14 of FIG. 2. FIG. 8 is a side view showing a state that an injection molded body 110A is placed on a holding section 34 of a transfer mold 130. FIG. 9 is a side view of the transfer mold 130 and a sintered body 110E in which a flat plate base section 10P is bent in the secondary shaping to form a bend base section surface 10R.

Process of Placing Injection Molded Body 110A on Transfer Mold 130

At step S30 (an injection molded body placing process), the worker places an injection molded body 110A on the holding section 34 formed on an upper side section from a transcribing surface 132 of a transfer mold 130, as shown in FIG. 8. Note that the inside measurement WJ of the holding section 34 is narrower than the body width WA of the injection molded body 110A and wider than the body width of the shrunken intermediate shaped body after the debindering (or during the secondary shaping). Therefore, the state that the injection molded body 110A has been placed on the holding section 34 can be maintained.

The injection molded body 110A shown in FIG. 8 has the flat plate base section 10P and the plurality of convex sections 10V disposed to extend vertically from the flat plate base section 10P. For example, the injection molded body 110A has a width and a length, each of which is from about 10 mm to about 500 mm in a top view. The thickness of the flat plate base section 10P is from 1 mm to about 50 mm.

Also, the convex section 10V has the outside measurement from about 1 mm to about 50 mm and a height from about 2 mm to about 30 mm. As the shape, a column like convex section such as a circular column and a polygonal prismatic column or a plate like convex section can be used.

Debindering Process

At step S32 (the debindering process), the worker carries out the debindering such as the heating debindering, the light debindering, and the solvent debindering. By carrying out the debindering of the binder, the intermediate shaped body shrinks for 10-20%, compared with the injection molded body 110A. In this case, for example, since the body width of the intermediate shaped body becomes narrower than the inside measurement WJ of the holding section 34, like the body width WE of the sintered body 110E shown in FIG. 9, the intermediate shaped body moves (falls down) to and contacts the transcribing surface 132 of the transfer mold 130.

Sintering Process

At step S34 (the secondary shaping process) and step S36 (the sintering process), the worker heats the intermediate shaped body in the heating furnace under the vacuum atmosphere or the inert gas atmosphere to carry out the secondary shaping and the sintering. Thus, a sintered body 110E is produced. The shaping temperature at the time of secondary shaping is in a range from 1200 K to 1650 K (more desirably, in a range from 1473 K to 1573 K) when nickel-based alloy, cobalt-based alloy or steel is used as the metal powder. Also, a temperature in a range from (the melting point of the metal powder—300 K) to (the melting point—200 K) can be used as the shaping temperature when nickel-based alloy, cobalt-based alloy, aluminum alloy, copper alloy or steel is used as the metal powder. Also, as the sintering temperature (containing the shaping temperature of the secondary shaping), a temperature in a range from 74% to 96% of the melting point in the thermodynamics temperature of the metal powder can be used. The shaping temperature is a temperature at which the boundary of grains of the metal powder is in a phase between a solid phase and a liquid phase so as to cause surface melting, and is sometimes different depending on the grain diameter of the metal powder. Under this shaping temperature, the intermediate shaped body becomes a soft state like a heated candy.

The crystal grain boundary is formed, in which a coupling section (neck) is formed, from the state in which the surface melting occurs in the metal powder under the shaping temperature so that the metal powder grains of the intermediate shaped body contact with each other. Moreover, the coupling section grows to change to a state to be easy to transform (the secondary shaping) and to be densified. At this time, since the intermediate shaped body contacts the transcribing surface 132, the intermediate shaped body moves (falls down) to the transcribing surface 132 due to its weight and the gravity and the flat plate base section 10P transforms into the bent base section surface 10R (the secondary shaping of the gravity shaping), to follow the transcribing surface 132, as shown in FIG. 9. When the temperature is lowered to the room temperature after a predetermined sintering time passes at a predetermined sintering temperature, the sintered body 110E is produced. Thus, the secondary shaping process and the sintering process are ended. Note that by carrying out the sintering, the sintered body 110E shrinks from 2% to 20% compared with the intermediate shaped body before the sintering. The material to endure a high temperature such as ceramics and the material used for the mold can be used as the material of the transfer mold 130. At the next step S39 (end debindering and sintering process), the debindering and sintering process shown at the step S14 of FIG. 2 is ended.

Example of Injection Molded Body 110A and Sintered Body 110E

Referring to FIG. 8 and FIG. 9, the sintered body 110E having 500 mm as the curvature radius of the bent base section surface 10R was shaped under the following conditions: the shape of the injection molded body 110A in the top view is 50 mm in width, 300 mm in length and 5 mm in thickness, the diameter of the plurality of convex sections 10V was 2 mm and the height of the convex section 10V was 8 mm, nickel-based alloy having a composition corresponding to the inconel 713 (registered trademark) was used for the metal powder, and a temperature in a range from 1473 K to 1573 K was used as the shaping temperature. Even in this case, the convex sections 10V of the sintered body 110E could maintain a state to extend radially in a normal direction to the bent base section surface 10R. For example, this structure is suitable for the structure of a combustor panel of the turbine engine and the convex sections 10V extending radially can be used as pins for heat radiation.

Also, as another example, the sintered body in which a part of 200 mm in length was bent to have 60 mm as curvature radius could be shaped under the following conditions: the injection molded body of the rectangular parallelepiped using nickel-based alloy for the metal powder had 10 mm in thickness (30 mm in width) and 200 mm in length, and the secondary shaping and the sintering were carried out by using the transfer mold at the secondary shaping temperature in a range from 1473 K to 1573 K. Even in this case, a crack and a wrinkle were not formed in the outer circumference and the inner circumference in the bent section.

Secondary Shaping Example Using Convex Type Transfer Mold 230

Figure 10:
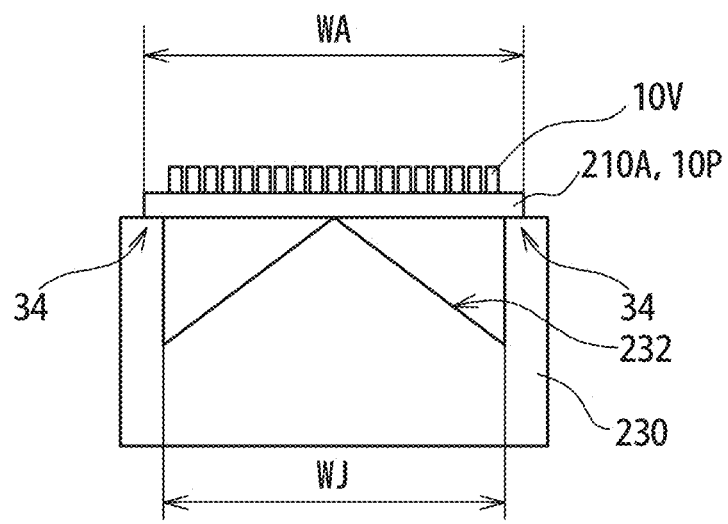
FIG. 10 is a side view showing a state that the injection molded body is placed on the holding section of the transfer mold.
Figure 11:
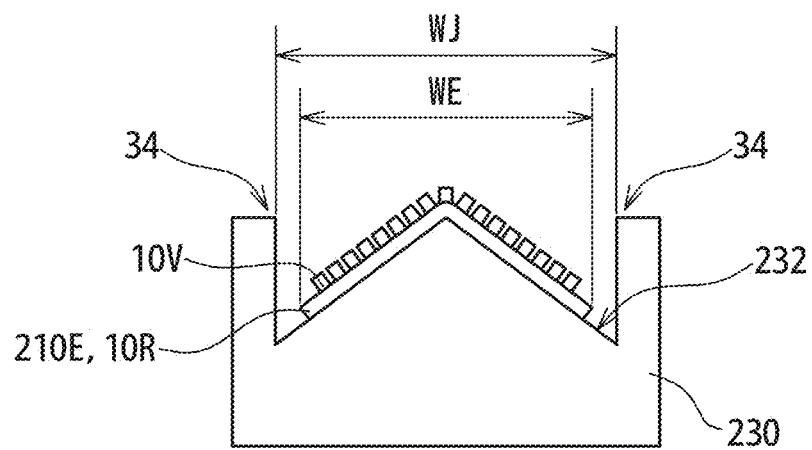
FIG. 11 is a side view showing the transfer mold and the sintered body in which the flat plate base section is bent in the secondary shaping to form the bent base section surface.

Next, referring to FIG. 10 and FIG. 11, an embodiment will be described in which the debindering is carried out in a state that an injection molded body 210A is placed on a transfer mold 230 having a convex type transcribing surface 232, and then the secondary shaping is carried out. Note that as the debindering and sintering process, the debindering and sintering process shown in FIG. 7 can be applied. FIG. 10 is a side view showing a state that the injection molded body 210A is placed on the holding section 34 of the transfer mold 230. FIG. 11 is a side view of the transfer mold 230 and a sintered body 210E that the flat plate base section 10P is bent by the secondary shaping to form the bent base section surface 10R. Note that regarding a part having the same function as the part described with reference to FIG. 8 and FIG. 9, the same reference numeral is assigned and the explanation is omitted.

Process of Placing Injection Molded Body 210A on Transfer Mold 230

The worker places the injection molded body 210A on the holding section 34 formed in the upper side section than a transcribing surface 232 of the transfer mold 230 (reference to the step S30 shown in FIG. 7), as shown in FIG. 10. In the embodiment shown in FIG. 10, a part of the underside of the flat plate base section 10P of the injection molded body 210A is placed on the holding section 34 and the transcribing surface 232. The inside measurement WJ of the holding section 34 is narrower than the body width WA of the injection molded body 210A and wider than the body width of the intermediate shaped body shrunken in the debindering (or during the secondary shaping).

The injection molded body 210A shown in FIG. 10 has the flat plate base section 10P and the plurality of convex sections 10V disposed to extend radially in a normal direction to the flat plate base section 10P. As the shape of the injection molded body 210A in the top view, the same injection molded body 110A as shown in FIG. 8 can be used.

Debindering Process

Next, the worker executes the debindering process such as the heating debindering, the light debindering, and the solvent debindering. By carrying out the debindering, the intermediate shaped body shrinks by 10 to 20% compared with the injection molded body 210A (reference to step S32 shown in FIG. 7).

Sintering Process

Next, the worker heats the intermediate shaped body in the heating furnace under the vacuum atmosphere or an inactive gas atmosphere to carry out the secondary shaping and the sintering. Thus, the sintered body 210E is produced. The temperatures described at the step S34 of FIG. 7 can be use as the shaping temperature and the sintering temperature. At the time of the sintering, the distance between grains of the metal powder becomes short so that the sintered body 210E shrinks more from the intermediate shaped body.

Like the body width WE of the sintered body 210E shown in FIG. 11, the body width of the intermediate shaped body becomes narrower than the inside measurement WJ of the holding section 34 so that the intermediate shaped body moves (falls down) onto the transcribing surface 232 due to the weight and the gravity. Also, the flat plate base section 10P is bent and transformed into the bent base section surface 10R, to follow the transcribing surface 232 (the secondary shaping by the gravity shaping). After a predetermined sintering time passes under a predetermined sintering temperature, the temperature is lowered to the room temperature. Thus, the sintered body 210E is produced and the sintering process ends.

Explanation of Embodiment in which Intermediate Shaped Body 310C, 10C is Placed on Transfer Mold to Carry Out Secondary Shaping Example of Secondary Shaping Using Convex Type Transcribing Surface 332

Figure 12:
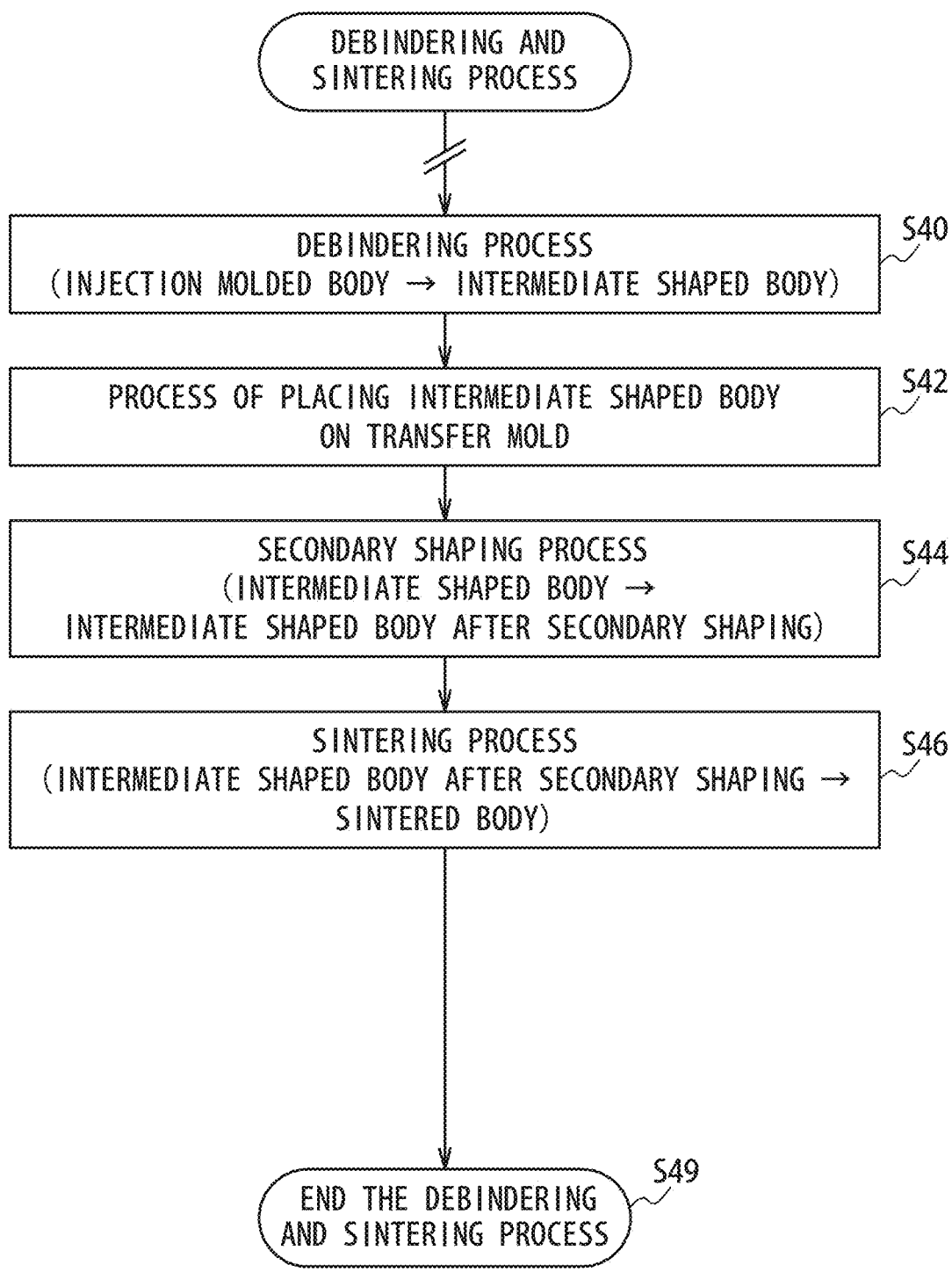
FIG. 12 is a flow chart showing the details of the debindering and sintering process shown at the step S14 of FIG. 2.
Figure 13:
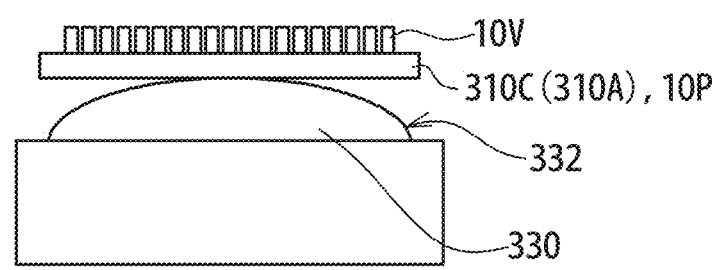
FIG. 13 is a side view showing a state that the intermediate shaped body is placed on the transfer mold.
Figure 14:
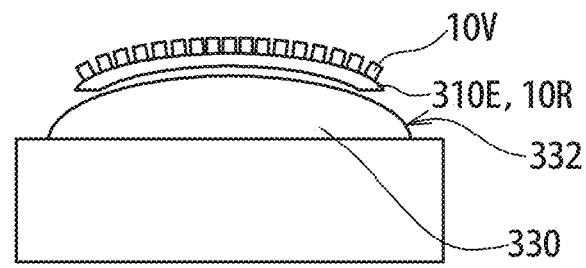
FIG. 14 is a side view showing the transfer mold and the sintered body in which the flat plate base section is bent in the secondary shaping to form the bent base section surface.

Next, referring to FIG. 12 to FIG. 14, an embodiment will be described in which the secondary shaping is carried out after the debindering is carried out in a state that an intermediate shaped body 310C (or an injection molded body 310A) is placed on a transfer mold 330 having a convex type transcribing surface 332. FIG. 12 is a flow chart showing the details of the debindering and sintering process shown at the step S14 of FIG. 2. FIG. 13 is a side view showing a state that the intermediate shaped body 310C is placed on the transfer mold 330. FIG. 14 is a side view of the transfer mold 330 and a sintered body 310E in which the bent base section surface 10R is formed by bending the flat plate base section 10P by the secondary shaping. Note that the part having the same function as the part described with reference to FIG. 8 and FIG. 9 is assigned with the same reference numeral and the explanation is omitted.

Debindering Process

At step S40 (debindering process), the worker carries out the debindering such as the heating debindering, the light debindering, and the solvent debindering to the injection molded body 310A to remove the binder in a state that the shape of the injection molded body 310A is maintained. Thus, the intermediate shaped body 310C is produced.

Process of Placing Intermediate Shaped Body 310C on Transfer Mold 330

At step S42 (process of placing intermediate shaped body on transfer mold), the worker places the intermediate shaped body 310C on the transcribing surface 332 of the transfer mold 330 as shown in FIG. 13. Note that in the pre-process of the debindering process, the injection molded body 310A may have been placed on the transcribing surface 332 of the transfer mold 330.

Secondary Shaping Process

At step S44 (secondary shaping process), the worker arranges and heats the intermediate shaped body 310C (or the injection molded body 310A) in the heating furnace, and maintains the shaping temperature for a predetermined time, to carry out the secondary shaping. Thus, an intermediate shaped body after secondary shaping is produced. The shaping temperature can be the sintering temperature described at the step S14 of FIG. 2 or the shaping temperature described at the step S34 of FIG. 7.

Sintering Process

At step S46 (sintering process), the worker arranges the intermediate shaped body after secondary shaping in the heating furnace, and maintains the sintering temperature for carrying out the sintering. After that, the temperature is lowered to the room temperature and the sintered body 310E is produced, and the sintering process ends. The convex sections 10V of the sintered body 310E are maintained in the state of extending radially in a normal direction to the bent base section surface 10R. Then, at the following step S49 (ending debindering and sintering process), the debindering and sintering process shown at the step S14 of FIG. 2 ends.

Other Embodiments

Next, referring to FIG. 1, FIG. 3, FIG. 4, FIG. 5, and FIG. 12, an embodiment will be described in which the secondary shaping is carried out after the debindering is carried out in a state that the intermediate shaped body 10C shown in FIG. 4 is placed on the transfer mold 30. Note that the explanation of FIG. 1, FIG. 3, FIG. 4, FIG. 5, and FIG. 12 is omitted to avoid the repetitive explanation.

Debindering Process

First, the worker carries out the debindering such as the heating debindering, the light debindering, and the solvent debindering to the injection molded body 10A to remove the binder in a state that the shape of the injection molded body 10A is maintained. Thus, the intermediate shaped body 10C shown in FIG. 3 is produced (reference to FIG. 12: Step S40 (debindering process)).

Process of Placing Intermediate Shaped Body 10C on Transfer Mold 30

Next, the worker places the intermediate shaped body 10C on the transcribing surface 32 of the transfer mold 30, as shown in FIG. 4 (reference to FIG. 12: Step S42 (process of placing intermediate shaped body on transfer mold).

Secondary Shaping Process

Next, the worker arranges and heats the intermediate shaped body 10C and the transfer mold 30 in the heating furnace in a state shown in FIG. 4, maintains the shaping temperature for a predetermined time, and carries out the secondary shaping to produce the intermediate shaped body 10D after secondary shaping shown in FIG. 5 (reference to FIG. 12: Step S44 (secondary shaping process)).

Sintering Process

Next, the worker arranges the intermediate shaped body 10D after secondary shaping in the heating furnace, and maintains the sintering temperature to carry out the sintering. After that, the temperature is lowered to the room temperature and a sintered body 10E shown in FIG. 1 is produced. Thus, the sintering process ends (reference to FIG. 12: Step S46 (sintering process)).

Explanation of Embodiment which Maintains Injection Molded Body 410A Previously in Debindering Process Embodiment in which Secondary Shaping is Carried Out by Inclining Intermediate Shaped Body 410C onto Transfer Mold 430

Figure 15:
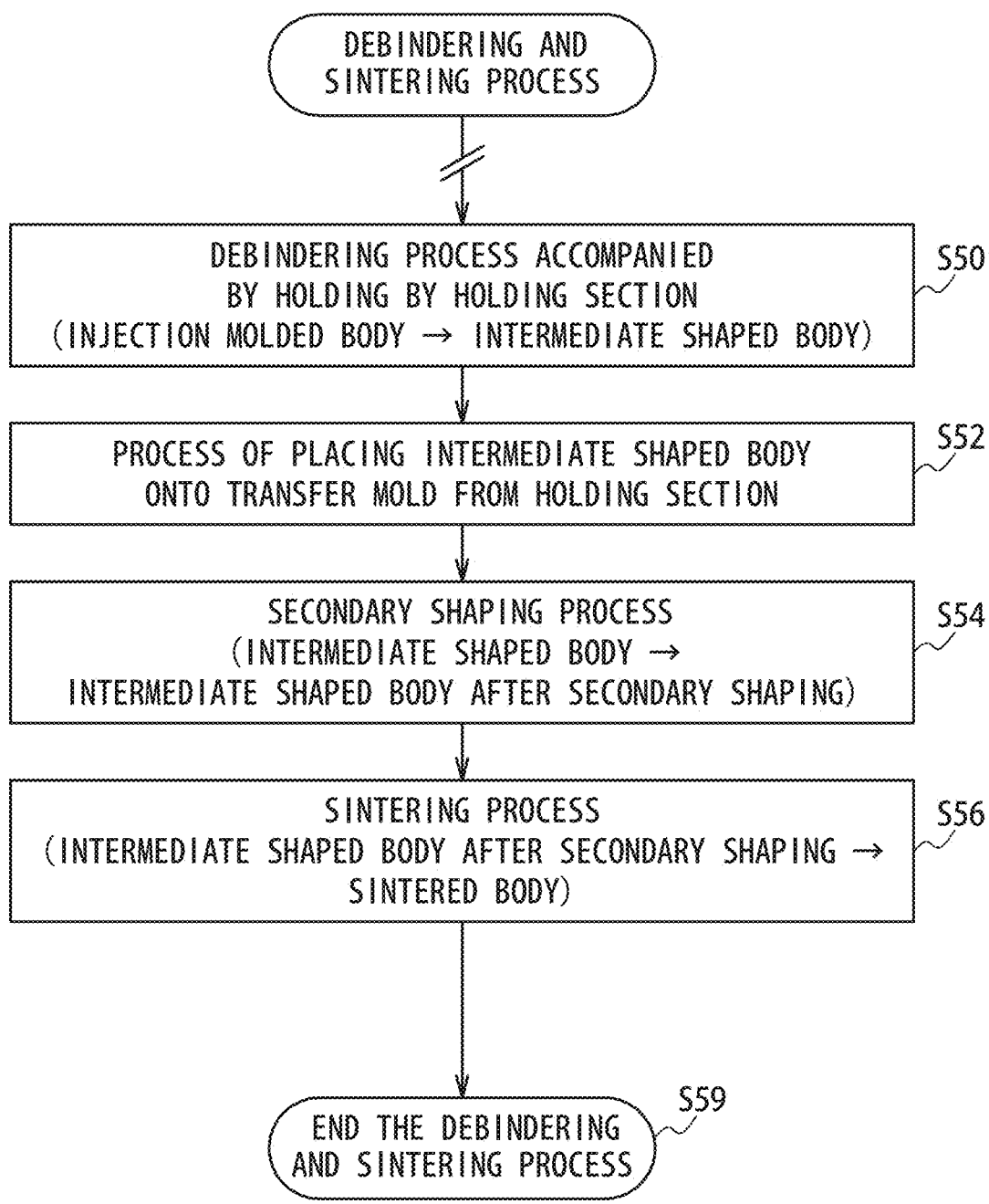
FIG. 15 is a flow chart showing the details of the debindering and sintering process shown at the step S14 of FIG. 2.
Figure 16:
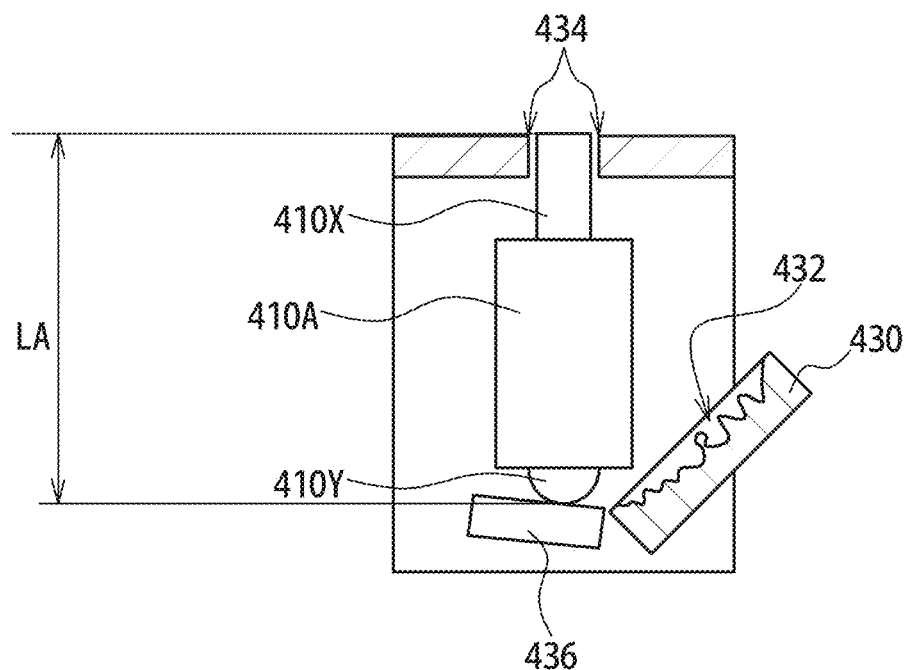
FIG. 16 is a side view showing a state that the injection molded body is held at an upright condition by the holding section in the debindering process.
Figure 17:
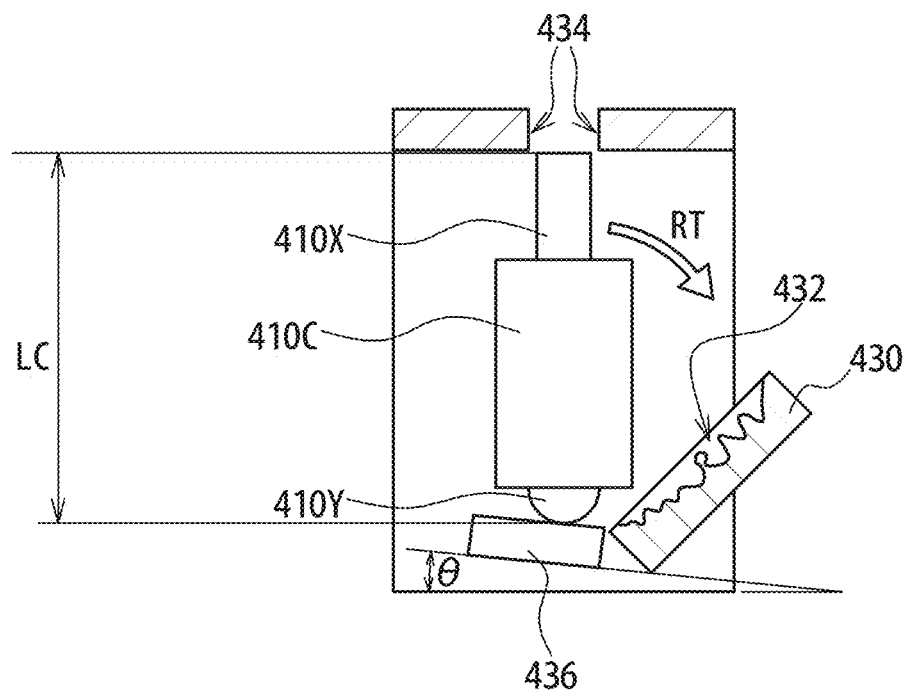
FIG. 17 is a side view showing a state that the holding condition is canceled since the held section is broken away from the holding section after the intermediate shaped body is formed.
Figure 18:
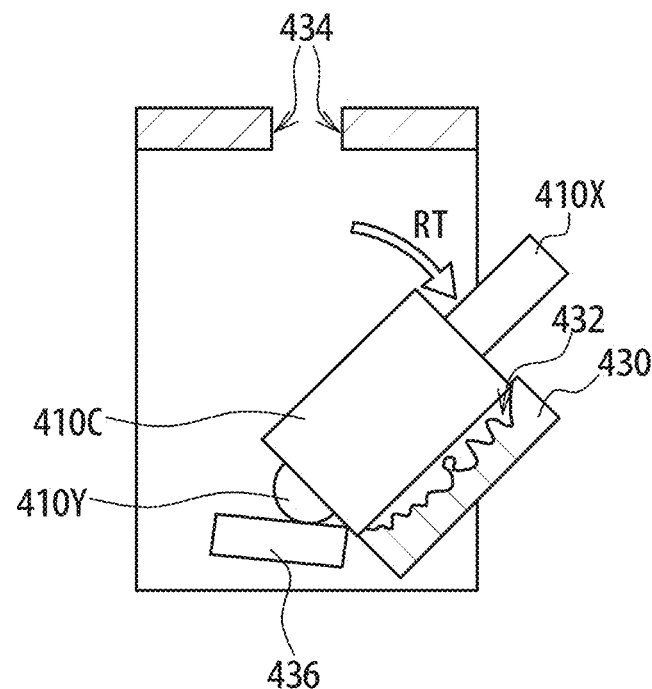
FIG. 18 is a side view showing a state that the intermediate shaped body is inclined on an inclination fulcrum point as a fulcrum point so that the intermediate shaped body is placed on the transfer mold.
Figure 19:
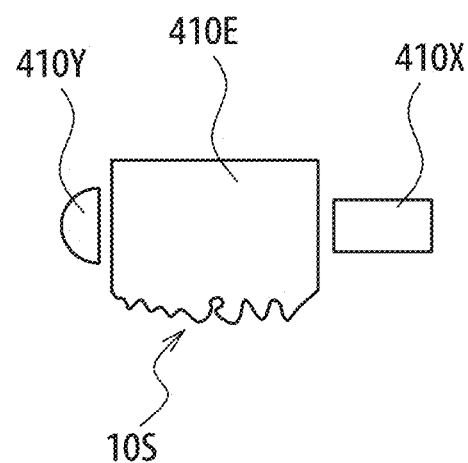
FIG. 19 is a side view showing the sintered body after the secondary shaping and a finishing process.

Next, referring to FIG. 15 to FIG. 19, an embodiment will be described in which an injection molded body 410A is held in an upright state by using a holding section 434 in the debindering process, and then the secondary shaping is carried out by inclining an intermediate shaped body 410C to a transcribing surface 432 of the transfer mold 430 after production of the intermediate shaped body 410C. FIG. 15 is a flow chart showing the details of the debindering and sintering process shown at the step S14 of FIG. 2. FIG. 16 is a side view showing that the injection molded body 410A is held in the upright state by using the holding section 434 in the debindering process. FIG. 17 is a side view showing a state that a held section 410X is left from the holding section 434 so as to cancel the holding condition after the production of the intermediate shaped body 410C. FIG. 18 is a side view showing a state that the intermediate shaped body 410C is placed on the transfer mold 430 by inclining the intermediate shaped body 410C to an RT direction by using an inclination fulcrum point 410Y as a fulcrum point. FIG. 19 is a side view of a sintered body 410E after secondary shaping and the finishing process.

Debindering Process Accompanied by Holding by Holding Section 434

At step S50 (debindering process accompanied by holding by the holding section), the worker arranges a support jig 436 in the inclination fulcrum point 410Y formed at the end (the bottom end) of the injection molded body 410A (the bottom end is shown as a semispherical form in the embodiment shown in FIG. 16 but it may be a tip end of a conical form, a circular column form or polygonal column form) to determine a gravity direction (injection molded body placing process). Moreover, the held section 410X formed at the other end (the top end) of the injection molded body 410A is held by the holding section 434.

The injection molded body 410A is positioned in the upper and lower direction (the gravity direction) by the inclination fulcrum point 410Y abutting the support jig 436. Also, the injection molded body 410A is positioned in a lateral direction (a direction orthogonal to the gravity direction) by the held section 410X distant from the inclination fulcrum point 410Y so as to abut the holding section 434. Thus, the inclination operation of the injection molded body 410A is restricted in the neighborhood of the inclination fulcrum point 410Y, so that the injection molded body 410A is maintained in a vertically standing state.

Next, the worker carries out the debindering process such as the heating debindering, the light debindering, and the solvent debindering to the injection molded body 410A to remove the binder in a state that the shape of the injection molded body 410A is maintained. Thus, the intermediate shaped body 410C is produced.

Next, the inclination operation of the intermediate shaped body 410C at step S52 [process of placing intermediate shaped body onto transfer mold from holding section] (intermediate shaped body placing process) will be described. As shown in FIG. 16 and FIG. 17, because the intermediate shaped body 410C shrinks in a range from 20% to 30% compared with the injection molded body 410A, the full length also becomes short from the full length LA (reference to FIG. 16) of the injection molded body 410A to the full length LC (reference to FIG. 17) of the intermediate shaped body 410C. In this case, the held section 410X of the intermediate shaped body 410C get out of the holding section 434 to the lower direction so that the inclination operation of the intermediate shaped body 410C becomes possible in the neighborhood of the inclination fulcrum point 410Y fulcrum 410Y as a center.

In the embodiment shown in FIG. 17, the support jig 436 is inclined to have the angle of θ. Thus, the intermediate shaped body 410C in which a limitation on the inclination operation is canceled inclines to the RT direction due to the gravity in the neighborhood of the inclination fulcrum point 410Y as a center. In this case, as shown in FIG. 18, the intermediate shaped body 410C leaves from the holding section 434 due to the gravity and is placed on the transcribing surface 432 of the transfer mold 430.

Secondary Shaping Process

At step S54 (secondary shaping process), the worker heats the intermediate shaped body 410C in the heating furnace and maintains the shaping temperature for a predetermined time to produce the intermediate shaped body after secondary shaping. As the shaping temperature, the sintering temperature described at the step S14 of FIG. 2 or the shaping temperature described at the step S34 of FIG. 7 can be used. In this process, the shape of transcribing surface 432 is transcribed to the surface of the intermediate shaped body 410C.

Sintering Process

At step S56 (sintering process), the worker arranges the intermediate shaped body after secondary shaping in the heating furnace, and maintains the inside of heating furnace to the predetermined sintering temperature for the sintering. After that, when the temperature is lowered to the room temperature, the sintered body 410E is produced (reference to FIG. 19). Thus, the sintering process ends. The transcription shape of the transcribing surface 432 of the transfer mold 430 is transcribed to a secondary shaped part 10S of the sintered body 410E. After that, in the finishing process, the held section 410X and the inclination fulcrum point 410Y which are unnecessary for the product are cut off to remove, as shown in FIG. 19. At the next step S59 (ending debindering and sintering process), the debindering and sintering process shown at the step S14 of FIG. 2 is ended.

Torsion Secondary Shaping

Figure 20:
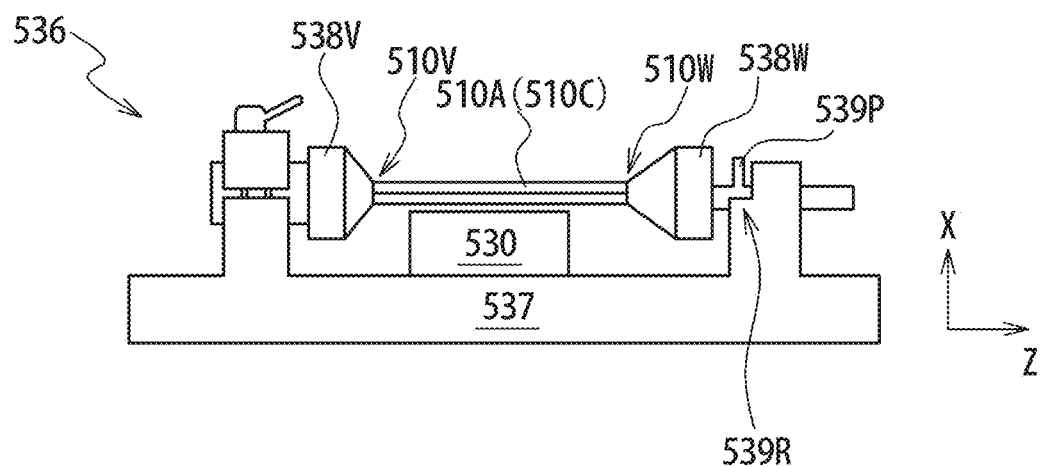
FIG. 20 is a side view showing a state that a first part and a second part of the injection molded body before the secondary shaping or the intermediate shaped body are grasped by a first grasping tool and a second grasping tool.
Figure 21:
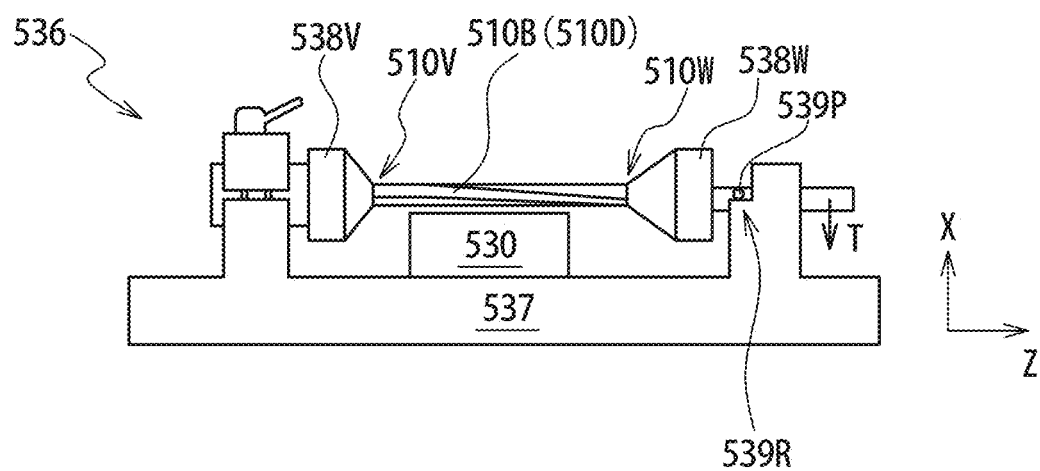
FIG. 21 is a side view showing the injection molded body or the intermediate shaped body after a torsion secondary shaping in which a rotation torque is applied to the second grasping tool to relatively rotate the first grasping tool and the second grasping tool.

Next, referring to FIG. 20 and FIG. 21, the embodiment in which a torsion secondary shaping is carried out will be described. FIG. 20 is a side view showing a state that a first part 510V and a second part 510W of an injection molded body 510A before secondary shaping (or an intermediate shaped body 510C) are held by using a first grasping tool 538V and a second grasping tool 538W. FIG. 21 is a side view showing a condition of an injection molded body 510B (or an intermediate shaped body 510D) after a torsion secondary shaping in which rotation force (torque T) is applied to the second grasping tool 538W so that the first grasping tool 538V and the second grasping tool 538W (the first part 510V and the second part 510W) are relatively rotated.

Configuration of Torsion Secondary Shaping Jig 536

Referring to FIG. 20 and FIG. 21, the torsion secondary shaping jig 536 has a jig base 537, the first grasping tool 538V, the second grasping tool 538W, a second grasping tool locking convex section 539P, a torsion angle setting section 539R and a transfer mold 530 according to necessity.

The jig base 537 is a pedestal to hold the first grasping tool 538V and to hold the second grasping tool 538W to be rotatable. The jig base 537 is configured of material usable under the environment of secondary shaping such as the shaping temperature and the sintering temperature (a material to endure high temperature such as ceramics and a material used for a mold can be used), together with the first grasping tool 538V and the second grasping tool 538W.

The first grasping tool 538V is a jig to grasp the first part 510V of the material to which the torsion secondary shaping is carried out (the injection molded body 510A before secondary shaping or the intermediate shaped body 510C after debindering). The first grasping tool 538V has a structure to fix to the jig base 537 so as not to rotate around the Z axis as shown in FIG. 20 and FIG. 21. The first grasping tool 538V can adjust the grasping position of the injection molded body 510A (or the intermediate shaped body 510C) in the Z axis direction.

The second grasping tool 538W is a jig that grasps the second part 510W of the material (the injection molded body 510A before secondary shaping or the intermediate shaped body 510C after debindering) to which the torsion secondary shaping is carried out. The second grasping tool 538W is supported to be rotatable around the Z axis and movable in the Z axial direction to the jig base 537 shown in FIG. 20 and FIG. 21. Also, the second grasping tool 538W can apply the torsion force to the injection molded body 510A (or the intermediate shaped body 510C after debindering) by applying torque T around the Z axis under the environment of the secondary shaping.

The second grasping tool locking convex section 539P is provided at a part rotating in conjunction with the second grasping tool 538W so as to protrude, in order to set the torsion angle when the torsion secondary shaping is carried out. Also, the torsion angle setting section 539R abuts the second grasping tool locking convex section 539P to have rotated, to limit the rotation angle of the second grasping tool 538W.

The transfer mold 530 may be arranged on a part of the jig base 537 according to necessity, to prevent transformation of the injection molded body 510A (or the intermediate shaped body 510C after debindering) due to the gravity or to carry out the gravity shaping, that is accompanied by the transformation, to the injection molded body 510A (or the intermediate shaped body 510C after debindering).

Grasping Process

Referring to FIG. 20, the first part 510V and the second part 510W of the injection molded body 510A before secondary shaping (or the intermediate shaped body 510C) are grasped by using the first grasping tool 538V and the second grasping tool 538W. The shape of the injection molded body 510A (or the intermediate shaped body 510C) may be a rectangular parallelepiped, a polygonal prism body, a turbine blade, and other shapes. As shown in FIG. 20, the second grasping tool locking convex section 539P and the torsion angle setting section 539R are separated by a predetermined angle (an angle by which torsion transformation is applied) in a state that the injection molded body 510A before secondary shaping (or the intermediate shaped body 510C) is installed to the torsion secondary shaping jig 536.

Secondary Shaping Process

Next, referring to FIG. 21, force to rotate the first grasping tool 538V and the second grasping tool 538W (the first part 510V and the second part 510W) relatively is continues to be applied by applying rotation force (torque T) to the second grasping tool 538W. Then, the secondary shaping (reference to FIG. 6) to the injection molded body 510A or the secondary shaping (reference to FIG. 7) to the intermediate shaped body 510C are carried out to attain torsion transformation. When the first part 510V and the second part 510W are relatively rotated and the angle between both reaches a predetermined angle (an angle necessary for torsion transformation), the second grasping tool locking convex section 539P abuts the torsion angle set section 539R and prevents the second grasping tool 538W from being further rotated. In this way, torsion transformation for the predetermined angle can be accomplished.

Another Embodiment

Figure 22:
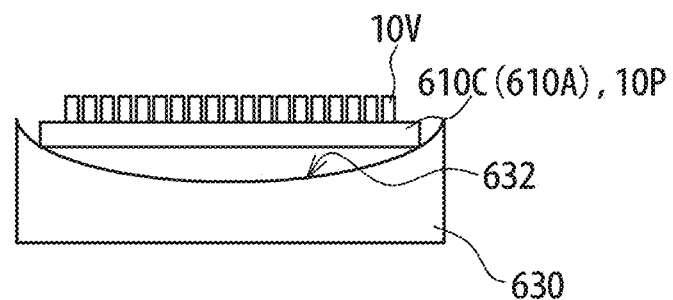
FIG. 22 is a side view showing a state that the injection molded body or the intermediate shaped body are placed on the transfer mold.
Figure 23:
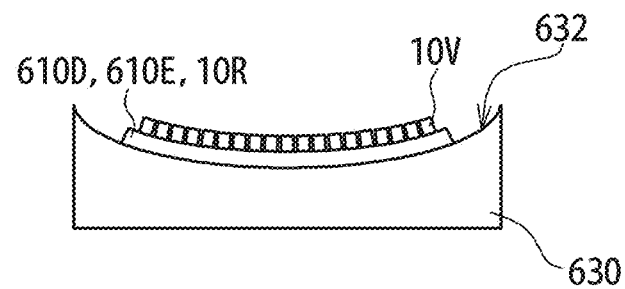
FIG. 23 is a side view showing the transfer mold and the sintered body in which the flat plate base section is bent in the secondary shaping to form the bent base section surface.

Next, another embodiment using the debindering and sintering process shown in FIG. 12 will be described with reference to FIG. 22 and FIG. 23. FIG. 22 is a side view showing a state that an intermediate shaped body 610C (an injection molded body 610A) is placed on a transfer mold 630. FIG. 23 is a side view showing the transfer mold 630 and an intermediate shaped body 610D (a sintered body 610E) in which the flat plate base section 10P is bent by the secondary shaping to form the bent base section surface 10R. Note that a part having the same function as the part described with reference to FIG. 8 and FIG. 9 is assigned with the same reference numeral and the explanation is omitted.

Debindering Process

First, the worker carries out the debindering such as the heating debindering, the light debindering, and the solvent debindering to the injection molded body 610A to remove the binder in a state that the shape of the injection molded body 610A is maintained. Thus, the intermediate shaped body 610C is produced (reference to FIG. 12: Step S40 (debindering process)).

Process of Placing Intermediate Shaped Body 610C on Transfer Mold 30

Next, the worker places the intermediate shaped body 610C on a transcribing surface 632 of the transfer mold 630, as shown in FIG. 22 (reference to FIG. 12: Step S42 (process of placing intermediate shaped body on transfer mold)). Note that in the pre-step of the debindering process, the injection molded body 610A may have been placed on the transcribing surface 632 of the transfer mold 630 in advance.

Secondary Shaping Process

Next, the worker arranges and heats the intermediate shaped body 610C and the transfer mold 630 in the heating furnace in a state shown in FIG. 22 and maintains the shaping temperature for a predetermined time to produce the intermediate shaped body 610D after secondary shaping shown in FIG. 23. Thus, the secondary shaping is carried out (reference to FIG. 12: Step S44 (secondary shaping process)).

Sintering Process

Next, the worker arranges the intermediate shaped body 610D after secondary shaping in the heating furnace, and carries out a sintering by maintaining the sintering temperature. After that, the temperature is lowered to the room temperature and the sintered body 610E shown in FIG. 23 is produced. Thus, the sintering process is ended (reference to FIG. 12: Step S46 (sintering process)). The convex section 10V of the sintered body 610E maintains a state of radially extending to the normal direction to the bent base section surface 10R.

Explanation of Conventional Combustor Panel

Figure 24:
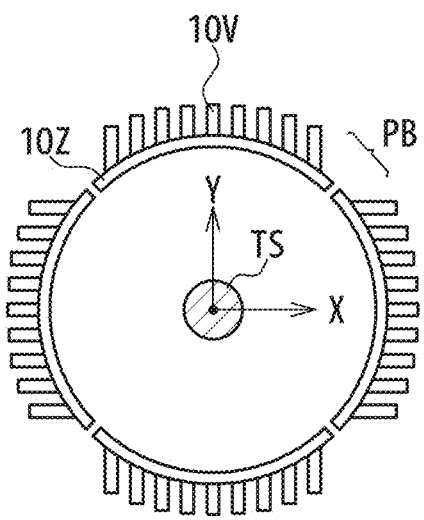
FIG. 24 is a partial cross-sectional view showing a state that combustor panels (the sintered bodies) of a turbine engine formed by the primary shaping using a conventional MIM are combined.

FIG. 24 is a partial cross-sectional view showing a state that the combustor panels (the sintered bodies 10Z) of a primary-shaped turbine engine by conventional MIM are combined. Note that a center of the plurality of combustor panels (the sintered bodies 10Z) is a turbine axis TS.

Conventionally, when the combustor panel (the sintered body 10Z) which was formed by sintering a metal powder having heat resistance was shaped by MIM without carrying out secondary shaping, it was necessary to design the shape so that convex sections 10V for heat radiation (heat radiation pins) were easy to pull out from the injection mold. For example, it was necessary to shape so that the convex sections 10V for heat radiation (heat radiation pins) were required to be parallel in one combustor panel (a sintered body 10Z) (parallel to the X axis or the Y axis in an example shown in FIG. 24).

In this case, as shown in FIG. 24, there is a possibility that a density of the convex sections 10V for heat radiation decreases in a connection section PB between the combustor panels (the sintered bodies 10Z), so that the temperature of the combustor panel (the sintered body 10Z) rises locally in the connection section PB.

Figure 25:
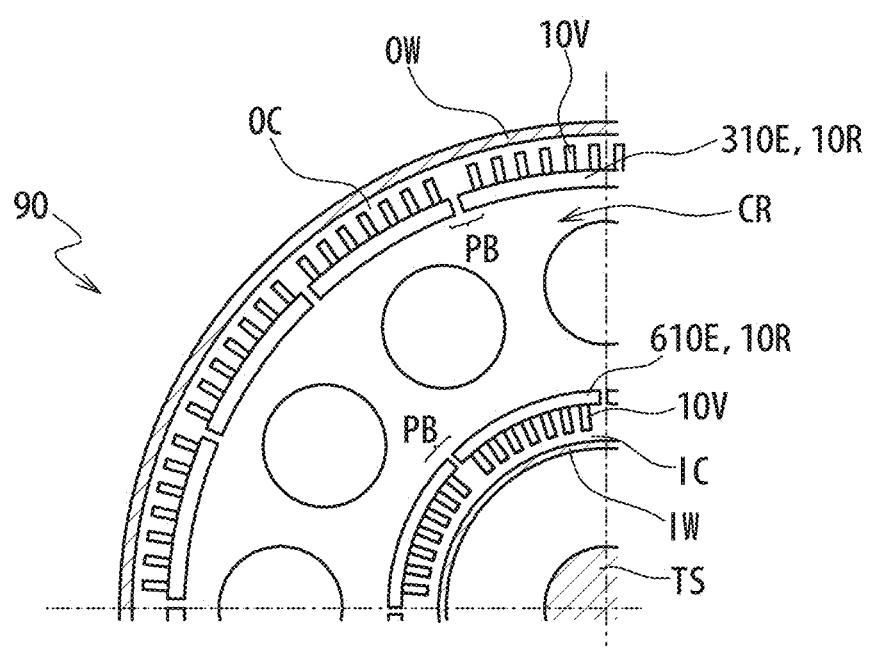
FIG. 25 is a cross-sectional view showing a neighborhood of a combustion chamber of the turbine engine using the sintered body having received the secondary shaping as the combustor panels of the turbine engine.

Embodiment Using Sintered Bodies 310E and Sintered Bodies 610E for Combustor Panels FIG. 25 shows an embodiment using the sintered body 310E or the sintered body 610E as the combustor panel of the turbine engine 90. FIG. 25 is a cross-sectional view schematically showing a state that a part of the combustion chamber CR of the turbine engine 90 is cut with a plane orthogonal to the turbine axis TS.

In the embodiment shown in FIG. 25, the turbine engine 90 has the turbine axis TS, the combustion chamber CR, an inner wall IW, an inner combustor panel (the sintered body 610E), an inner cooling passage IC, an outer combustor panel (the sintered body 310E), an outer wall OW and an outer cooling passage OC. The inner combustor panel (the sintered body 610E) is attached to the inner wall IW through a plurality of studs (not shown). Also, in the same way, the outer combustor panel (the sintered body 310E) is attached to the outer wall OW through a plurality of studs (not shown).

Because the combustion chamber CR of the turbine engine 90 continues to be exposed to a high temperature atmosphere, air obtained from a compressor is supplied to the inner cooling passage IC and the outer cooling passage OC to cool the inner combustor panel (the sintered body 610E) and the outer combustor panel (the sintered body 310E). Here, to promote the cooling of the inner combustor panel (the sintered body 610E), many convex sections 10V for heat radiation extend in a normal direction to the bent base section surface 10R for the inside of the inner cooling passage IC from the bent base section surface 10R of the inner combustor panel (the sintered body 610E).

Also, in the same way, to promote the cooling of the outer combustor panel (the sintered body 310E), many convex sections 10V for heat radiation extend in a normal direction to the bent base section surface 10R (radially) for the inside of the outer cooling passage OC from the bent base section surface 10R of the outer combustor panel (the sintered body 310E). Thus, a density of the convex sections 10V for heat radiation can be made uniform even in a connection section PB between the inner combustor panels (the sintered bodies 610E) and the outer combustor panels (the sintered bodies 310E) shown in FIG. 25. Thus, a local temperature increase can be eased in the connection section PB between the inner combustor panels (the sintered bodies 610E) and the outer combustor panels (the sintered bodies 310E).

Embodiment in which Secondary Shaping is Carried Out after Temporary Sintering

Next, an embodiment in which the secondary shaping is carried out after temporary sintering, in the debindering and sintering process shown at the step S14 of FIG. 2 will be described.

The injection molded body is arranged on a temporary sintering jig such as a pedestal to prevent a shape collapse, and processing of the debindering process and the temporary sintering process is carried out. In the temporary sintering process, the heating is carried out at a temporary sintering temperature under a vacuum atmosphere or an inert gas atmosphere after the debindering, to carry out the sintering slightly while maintaining the shape of the intermediate shaped body.

The temporary sintering temperature at the time of the temporary sintering is in a range from 1200 K to 1400 K when nickel-based alloy, cobalt-based alloy or steel is used as the metal powder. Also, when nickel-based alloy, cobalt-based alloy, aluminum alloy, copper alloy or steel is used as the metal powder, the temporary sintering temperature is in a range from (the melting point of the metal powder—500 K) to (the melting point—240 K). Also, as the temporary sintering temperature, a temperature in a range from 60% to 65% of the melting point in the thermodynamics temperature of the metal powder can be used.

The temporary sintering temperature is a temperature at which the boundary of the metal powder is between the solid phase and the liquid phase so that surface melting is caused slightly, and sometimes depends on the grain diameter of the metal powder. The change in the size of the intermediate shaped body after the temporary sintering is slight compared with the size of the intermediate shaped body before the temporary sintering. After the temporary sintering ends, the intermediate shaped body after temporary sintering is placed on the transfer mold to carry out the secondary shaping and the sintering. Thus, the shape transcription is carried out.

In the above, with reference to the embodiments, the sintered body and the method of manufacturing the sintered body, and the combustor panel and the method of manufacturing the combustor panel according to the present invention have been described. However, the sintered body and the method of manufacturing the sintered body and the combustor panel and the method of manufacturing of the combustor panel according to the present invention are not limited to the above embodiments. Various changes or modifications can be carried out to the above embodiments. The technical matter described in the above one embodiment and the technical matter described in the above another embodiment can be combined.

This patent application is based on Japanese patent application (JP 2016-076124) and claims priority based on the application. The disclosure of the application is incorporated in this patent application by reference.

The invention claimed is:

1. A method of manufacturing a sintered body comprising:
a debindering process of carrying out a debindering to an injection molded body produced by a primary shaping by injecting into an injection mold a shaping material in which a metal powder and a binder are mixed, to produce an intermediate shaped body;
a sintering process of carrying out a sintering to the intermediate shaped body to produce a sintered body; and
a secondary shaping process of transforming the injection molded body or the intermediate shaped body before the sintered body is produced,
wherein the secondary shaping process includes a process of grasping a first part and a second part of the injection molded body or the intermediate shaped body, and rotating the first part and the second part relatively to apply torsion transformation to the injection molded body or the intermediate shaped body.

2. The method of manufacturing the sintered body according to claim 1, wherein the metal powder is nickel-based alloy, cobalt-based alloy or steel, and
wherein the shaping temperature in the secondary shaping process is a range from 1200 K to 1650 K.

3. The method of manufacturing the sintered body according to claim 1, wherein the shaping temperature in the secondary shaping process is in a temperature range which causes surface melting of the metal powder.

4. The method of manufacturing the sintered body according to claim 1, wherein the secondary shaping process is carried out before the debindering process.

* * * * *